(12) United States Patent
Matsuda et al.

(10) Patent No.: US 10,296,274 B2
(45) Date of Patent: May 21, 2019

(54) ELECTRONIC APPARATUS AND METHOD

(71) Applicant: Toshiba Client Solutions CO., LTD., Koto-ku, Tokyo (JP)

(72) Inventors: Kyohei Matsuda, Ome Tokyo (JP); Yoshio Matsuoka, Ome Tokyo (JP); Kouetsu Wada, Nishitama Tokyo (JP); Kohei Momosaki, Mitaka Tokyo (JP); Tsukasa Nunami, Ome Tokyo (JP)

(73) Assignee: Toshiba Client Solutions Co., Ltd., Tokyo (JP)

( * ) Notice: Subject to any disclaimer, the term of this patent is extended or adjusted under 35 U.S.C. 154(b) by 160 days.

(21) Appl. No.: 15/386,315

(22) Filed: Dec. 21, 2016

(65) Prior Publication Data

US 2017/0185361 A1 Jun. 29, 2017

(30) Foreign Application Priority Data

Dec. 25, 2015 (JP) .................................. 2015-253896

(51) Int. Cl.
| | |
|---|---|
| G06F 9/451 | (2018.01) |
| G06F 3/14 | (2006.01) |
| G06F 3/0484 | (2013.01) |
| G06F 1/16 | (2006.01) |
| G06F 21/82 | (2013.01) |

(52) U.S. Cl.
CPC ............... G06F 3/14 (2013.01); G06F 1/165 (2013.01); G06F 1/1671 (2013.01); G06F 3/04847 (2013.01); G06F 9/452 (2018.02); G06F 21/82 (2013.01); *G09G 2320/0606* (2013.01); *G09G 2370/022* (2013.01)

(58) Field of Classification Search
CPC . G06F 3/14; G06F 9/452; G06F 1/165; G06F 3/04847; G06F 21/82; G06F 1/1671
See application file for complete search history.

(56) References Cited

U.S. PATENT DOCUMENTS 8,224,885 B1 * 7/2012 Doucette ............... G06F 9/5044
709/201
8,732,290 B2 * 5/2014 Goswami ............. G06Q 10/103
709/219

(Continued)

FOREIGN PATENT DOCUMENTS

| JP | 2000-231437 A | 8/2000 |
|---|---|---|
| JP | 2006-270689 A | 10/2006 |
| JP | 2012-032876 A | 2/2012 |

*Primary Examiner* — Tadesse Hailu
(74) *Attorney, Agent, or Firm* — Knobbe, Martens, Olson & Bear, LLP

(57) ABSTRACT

According to one embodiment, an electronic apparatus includes an input device configured to accept a user's operation and a hardware processor. The hardware processor is configured to receive a virtual desktop image transmitted by the server apparatus, display the received virtual desktop image on a screen, transmit, in a case where a second operation other than a first operation is accepted while the virtual desktop image has been displayed, operation information indicative of the second operation to the server apparatus, and display on the screen an indicator forward of the virtual desktop image, in a case where the first operation is accepted while the virtual desktop image has been displayed, the indicator being provided to change setting of hardware of the electronic apparatus.

7 Claims, 12 Drawing Sheets

(56) References Cited

U.S. PATENT DOCUMENTS

| | | | |
|---|---|---|---|
| 9,503,527 B1* | 11/2016 | O'Sullivan | H04L 67/141 |
| 10,015,232 B2* | 7/2018 | Clark | H04L 12/1822 |
| 2006/0218249 A1 | 9/2006 | Nakase | |
| 2011/0185355 A1* | 7/2011 | Chawla | G06F 9/5077 |
| | | | 718/1 |
| 2011/0225569 A1* | 9/2011 | Beaty | G06F 11/3414 |
| | | | 717/127 |
| 2011/0246904 A1* | 10/2011 | Pinto | G06F 9/452 |
| | | | 715/740 |
| 2012/0084381 A1* | 4/2012 | Alladi | G06F 9/544 |
| | | | 709/213 |
| 2012/0239729 A1* | 9/2012 | Hefter | G06F 9/4416 |
| | | | 709/203 |
| 2012/0303762 A1* | 11/2012 | Geiser | G06F 9/4416 |
| | | | 709/219 |
| 2013/0152085 A1* | 6/2013 | D'Amore | G06F 9/455 |
| | | | 718/1 |
| 2013/0227567 A1* | 8/2013 | Horikawa | G06F 9/45533 |
| | | | 718/1 |
| 2015/0082179 A1* | 3/2015 | Ayanam | H04L 67/143 |
| | | | 715/736 |
| 2015/0358392 A1* | 12/2015 | Ramalingam | G06F 16/972 |
| | | | 709/203 |
| 2016/0077685 A1* | 3/2016 | Fang | G06F 9/452 |
| | | | 715/778 |
| 2016/0085388 A1* | 3/2016 | Fang | G06F 9/4445 |
| | | | 715/778 |
| 2016/0147427 A1* | 5/2016 | Liverance | G06F 3/04847 |
| | | | 715/743 |
| 2016/0188356 A1* | 6/2016 | Ramasamy | G06F 9/45558 |
| | | | 718/1 |
| 2018/0012569 A1* | 1/2018 | Yoon | G09G 5/377 |

* cited by examiner

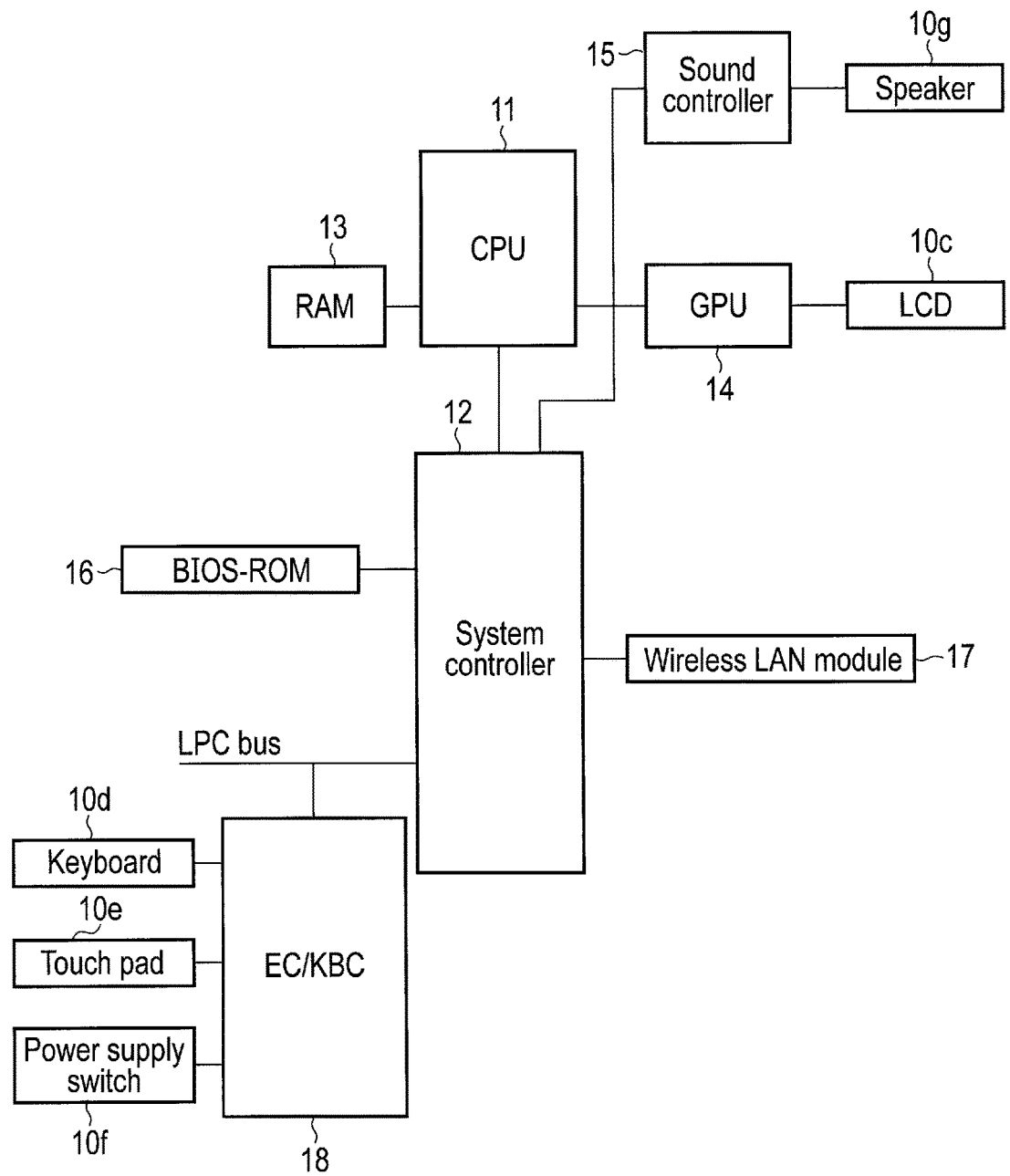
F I G. 2

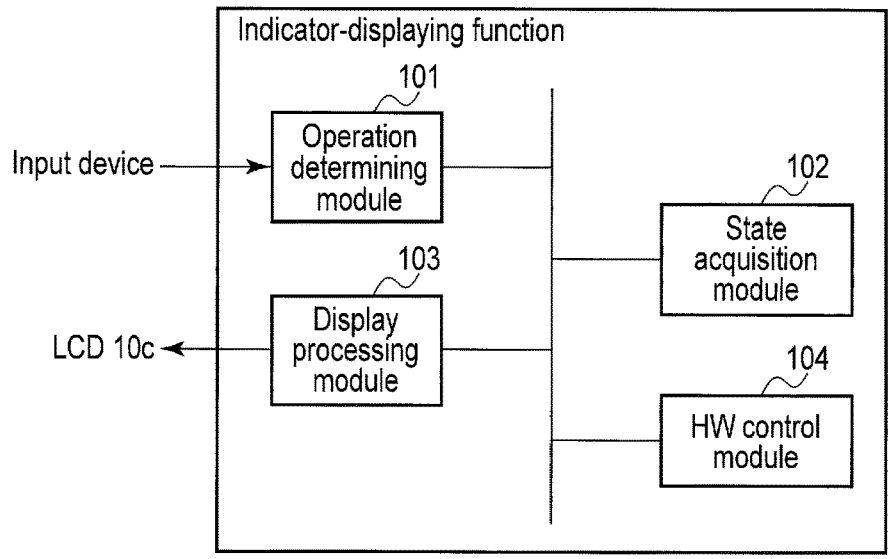
F I G. 7
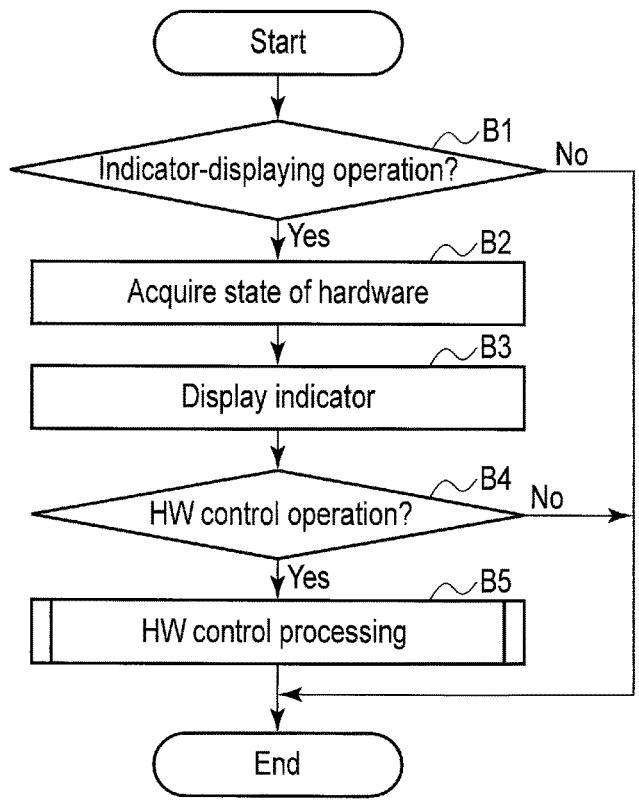
F I G. 8

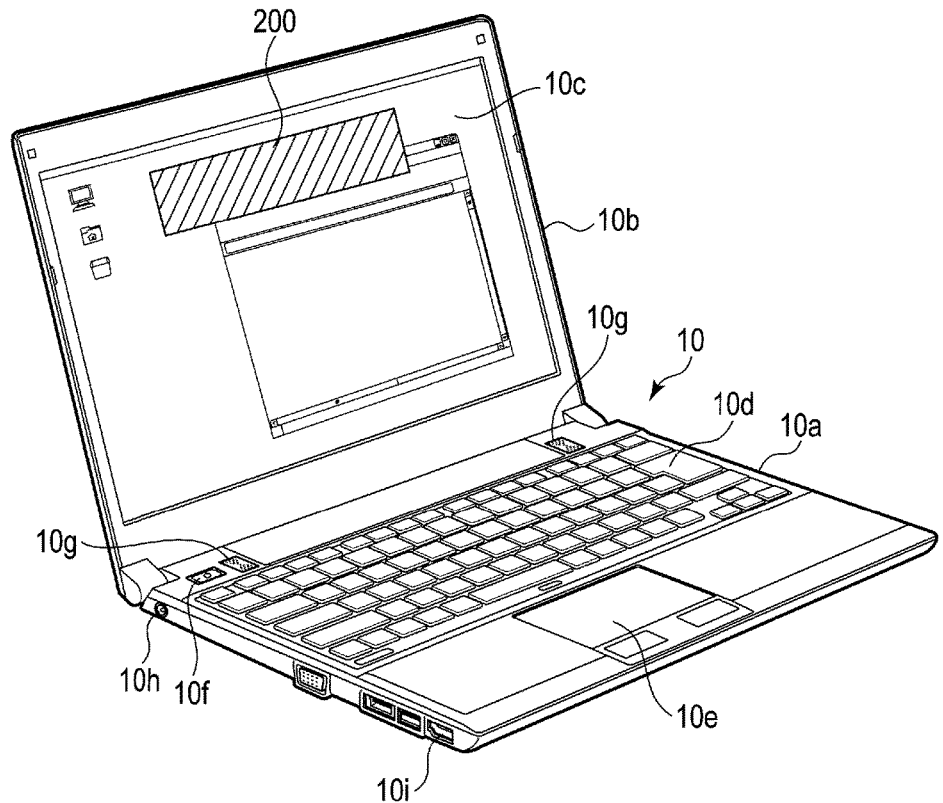
F I G. 10
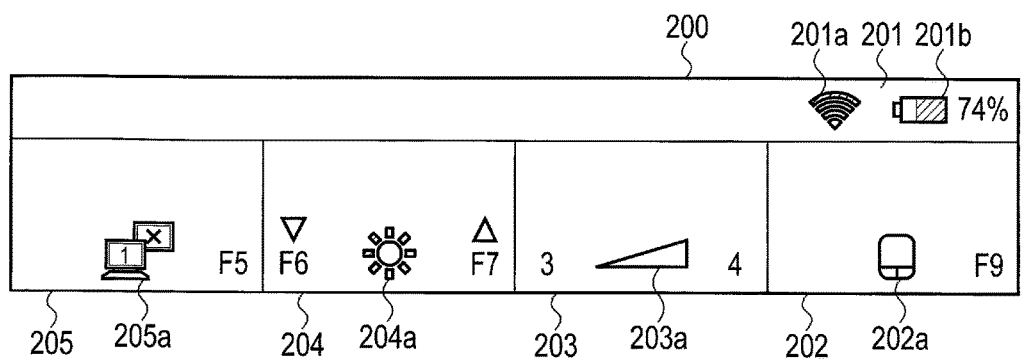
F I G. 11

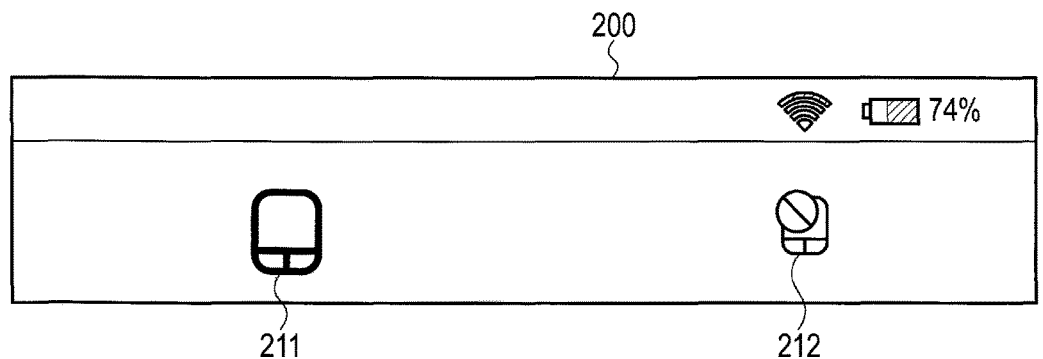
F I G. 12
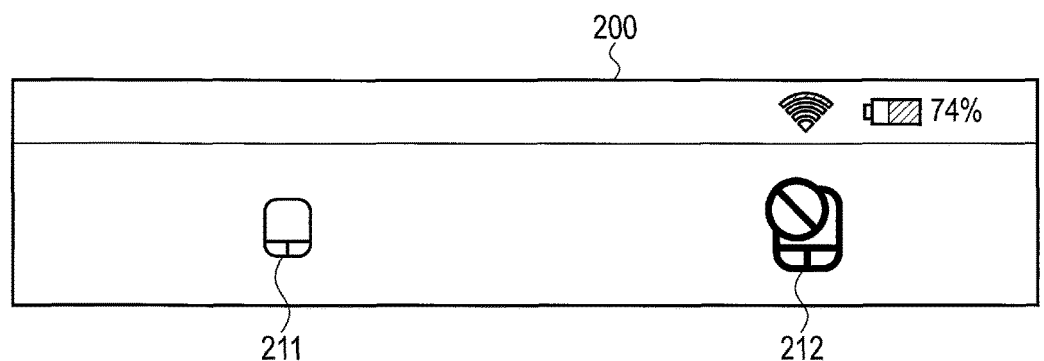
F I G. 13
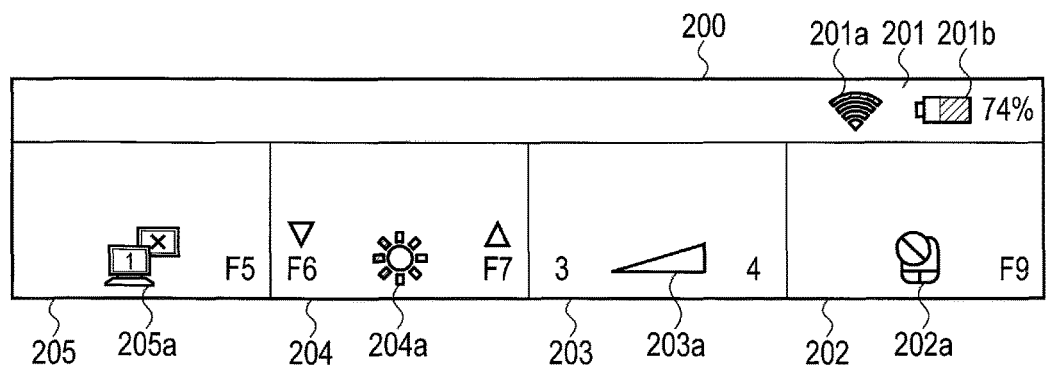
F I G. 14

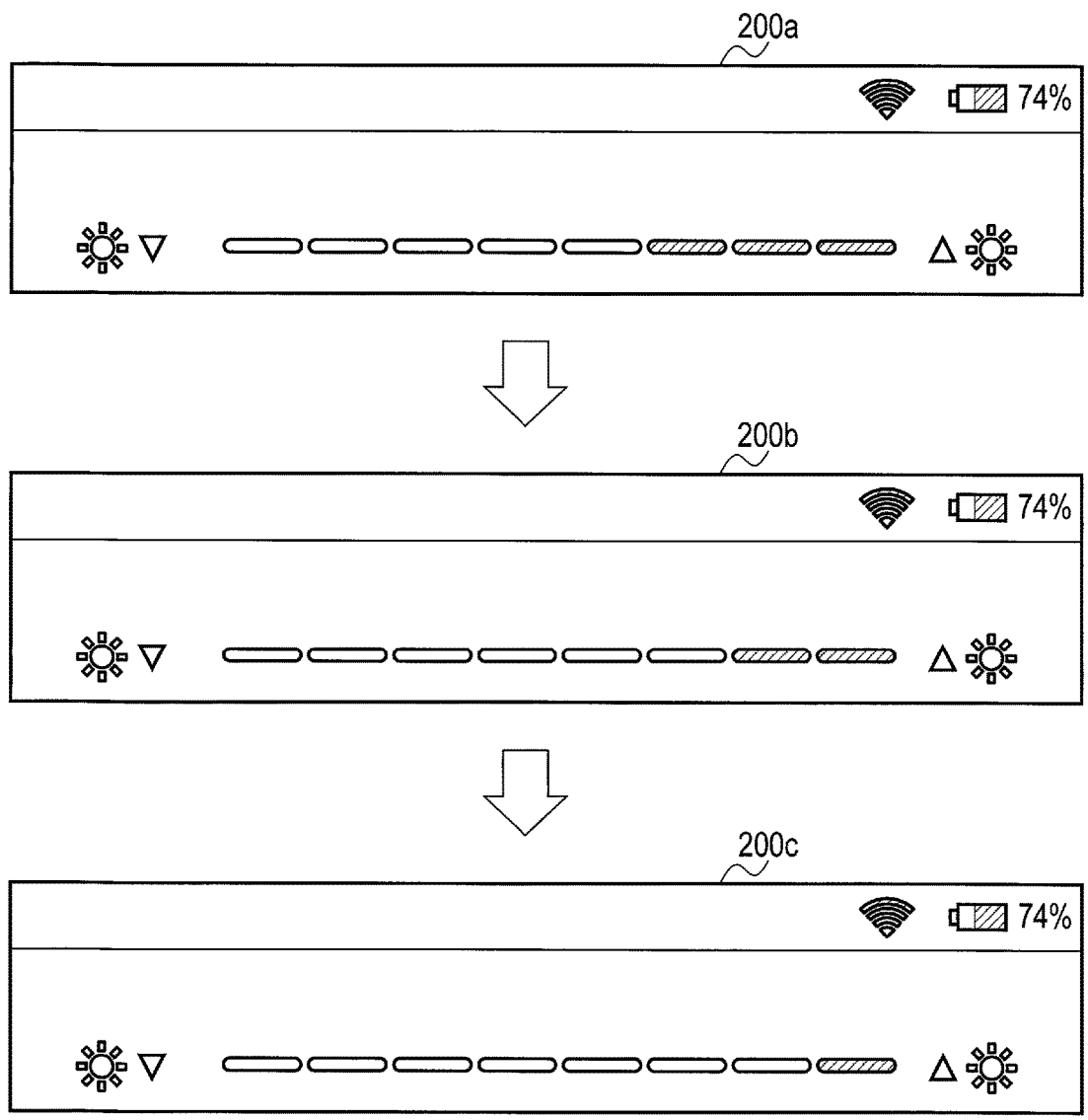
F I G. 15

US 10,296,274 B2

ELECTRONIC APPARATUS AND METHOD

CROSS-REFERENCE TO RELATED APPLICATIONS

This application is based upon and claims the benefit of priority from Japanese Patent Application No. 2015-253896, filed Dec. 25, 2015, the entire contents of which are incorporated herein by reference.

FIELD

Embodiments described herein relate generally to an electronic apparatus and a method.

BACKGROUND

In recent years, leakage of information from a stolen or lost electronic apparatus has become an issue. To be more specific, the issue has arisen that if an electronic apparatus such as a personal computer is stolen or lost, information is also stolen from the stolen or lost electronic apparatus.

Thus, companies, enterprises and the like, which are required to strictly manage information, are considering whether or not to introduce thin-client (zero client) systems in which electronic apparatuses (client terminals) for use by employees are operated under a virtual desktop environment.

In the thin-client system, a server apparatus solely manages resources such as various software and data, thereby enabling electronic apparatuses having a requisite minimum function only to be used as client terminals. If such an electronic apparatus is used, and then even if it is stolen or lost, the risk that information leakage will occur is low.

Incidentally, where a user uses an electronic apparatus in the above thin-client system, the electronic apparatus receives a virtual desktop image from the server apparatus. The virtual desktop image is displayed on a display of the electronic apparatus.

It should be noted that if the user performs an operation using an input device (for example, a keyboard, a touch pad or the like) provided in the electronic apparatus, with a virtual desktop image displayed on the display of the electronic apparatus, information on the operation (hereinafter referred to as operation information on the input device) is transmitted from the electronic apparatus to the server apparatus.

Upon reception of the operation information on the input device, the server apparatus produces a virtual desktop image which reflects the operation information (i.e., an operation performed by the user), and re-transmits the produced virtual desktop image to the electronic apparatus. The re-transmitted virtual desktop image is displayed on the display of the electronic apparatus. Accordingly, the image displayed on the display of the electronic apparatus is updated in accordance with the operation information on the input device by the user. Thereby, the user can use the electronic apparatus, which operates under the virtual desktop environment.

In such a manner, in the thin-client system, the operation information on the input device which is obtained when the user operates the input device, with the virtual desktop image displayed, is all sent to the server apparatus. Thus, using the input device, the user cannot change the setting of hardware of the electronic apparatus which operates under the virtual desktop environment (for example, switching between an available state/unavailable state of the touch pad or adjustment of the brightness of the display).

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is a view showing an example of the system configuration of the electronic apparatus.

FIG. 7 is a block diagram showing an example of the functional configuration related to an indicator-displaying function.

FIG. 8 is a flowchart showing an example of the procedure of processing of the electronic apparatus in the indicator-displaying function.

FIG. 10 is a view showing an example of a state where an indicator is displayed on the display of the electronic apparatus.

FIG. 11 is a view for specifically explaining the indicator displayed on the display of the electronic apparatus.

FIG. 12 is a view showing an example of indication of the indicator in the case where the indicator indicates the present set state of a touch pad.

FIG. 13 is a view showing an example of indication of the indicator in the case where an unavailable state of the touch pad is designated.

FIG. 14 is a view showing an example of indication of the indicator after the touch pad is set unavailable.

FIG. 15 is a view for explaining an example of changes of indication of the indicator when a set value of the brightness of the display is designated.

DETAILED DESCRIPTION

Various embodiments will be described hereinafter with reference to the accompanying drawings.

In general, according to one embodiment, an electronic apparatus being connectable to a server apparatus which provides a virtual desktop environment and being operatable under the virtual desktop environment is provided. The electronic apparatus includes an input device configured to accept a user's operation and a hardware processor. The hardware processor is configured to receive a virtual desktop image transmitted by the server apparatus; display the received virtual desktop image on a screen; transmit, in a case where a second operation other than a first operation is accepted by the input device while the virtual desktop image has been displayed, operation information indicative of the second operation to the server apparatus; and display on the screen an indicator forward of the virtual desktop image, in a case where the first operation is accepted by the input device while the virtual desktop image has been displayed, the indicator being provided to change setting of hardware of the electronic apparatus.

An electronic apparatus according to an embodiment is a client terminal (thin-client terminal) in a thin-client system, and is operatable under a virtual desktop environment provided by a server apparatus which is connectable to the electronic apparatus such that the server apparatus can communicate with the electronic apparatus.

The virtual desktop environment is a system for causing a desktop environment of the electronic apparatus to operate on the server apparatus. In this case, the electronic apparatus has only to have a barebones configuration such as a function of receiving a virtual desktop image from the server apparatus, and causing the virtual desktop image to be displayed on a display.

It should be noted that the electronic apparatus according to the embodiment is a clamshell device which is of the same type as, for example, a notebook personal computer (PC).

Figure 1:
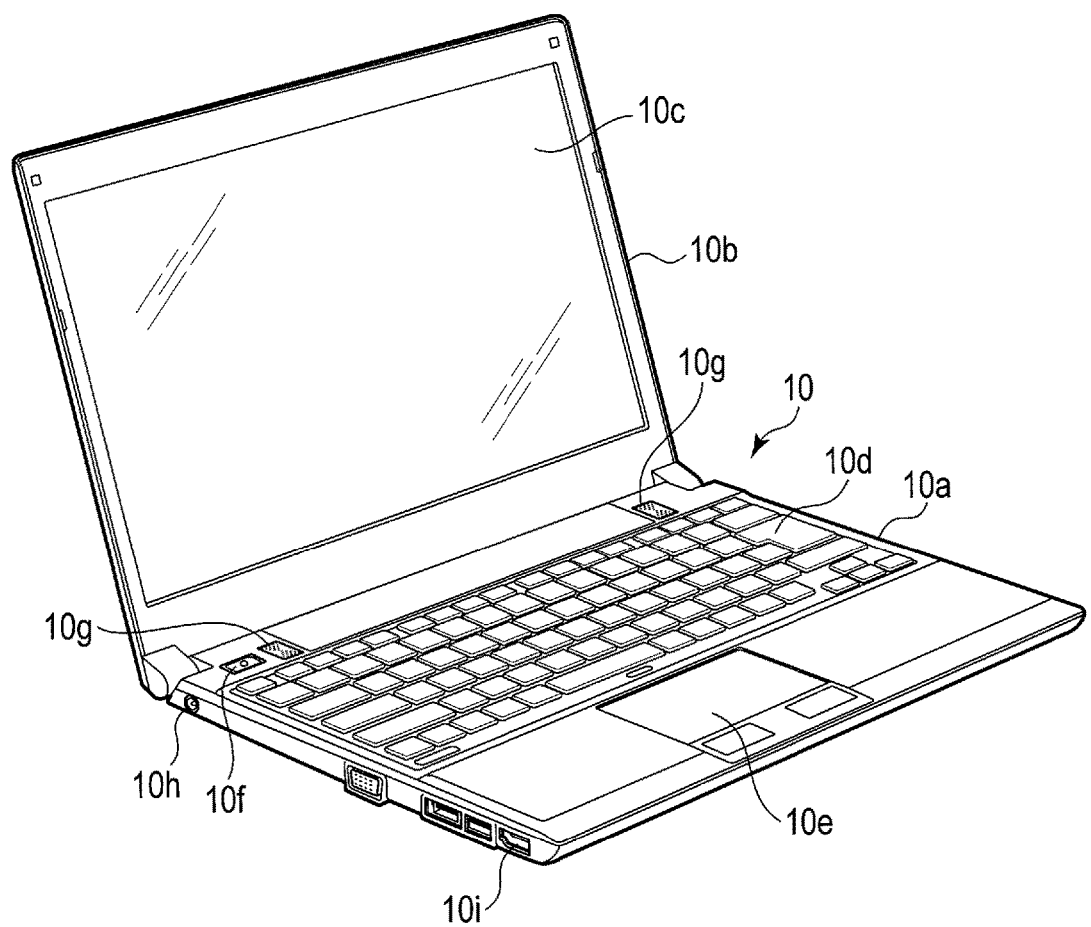
FIG. 1 is a perspective view showing an example of the appearance of an electronic apparatus according to an embodiment.

FIG. 1 is a perspective view showing an appearance of the electronic apparatus according to the embodiment. As shown in FIG. 1, the electronic apparatus 10 includes an electronic-apparatus body (computer body) 10*a* and a display unit 10*b*. In the display unit 10*b*, a display (screen) such as a liquid crystal display (LCD) 10*c* is incorporated.

The display unit 10*b* is attached to the electronic-apparatus body 10*a* in such a way as to be rotatable between an open position in which an upper surface of the electronic-apparatus body 10*a* is exposed to the outside and a closed position in which the upper surface of the electronic-apparatus body 10*a* is covered by the display unit 10*b*.

The electronic-apparatus body 10*a* has a housing formed in the shape of a thin box. On the upper surface of the electronic-apparatus body 10*a*, input devices such as a keyboard 10*d* and a touch pad 10*e* are provided which accept a user's operation. Also, on the upper surface of the electronic-apparatus body 10*a*, a power supply switch 10*f*, speakers 10*g*, etc., are further provided.

Furthermore, the electronic apparatus 10 receives power from, for example, a battery (not shown) incorporated in the electronic-apparatus body 10*a*.

The electronic-apparatus body 10*a* is provided with a power supply connector (DC power supply input terminal) 10*h*. The power supply connector 10*h* is provided in a side surface, for example, a left side surface of the electronic-apparatus body 10*a*. To the power supply connector 10*h*, an external power supply device is removably connected. As the external power supply device, an AC adapter can be used. The AC adapter is a power supply device configured to convert a commercial power (AC power) into DC power.

The electronic apparatus 10 is driven by power supplied from the battery or the external power supply device. Where the external power supply device is not connected to the power supply connector 10*h* of the electronic apparatus 10, the electronic apparatus 10 is driven by power supplied from the battery. By contrast, where the external power supply device is connected to the power supply connector 10*h* of the electronic apparatus 10, the electronic apparatus 10 is driven by power supplied from the external power supply device. Also, the power supplied from the external power supply device is used to charge the battery.

In addition, in the left side surface of the electronic-apparatus body 10*a*, a High-Definition Multimedia Interface (HDMI, registered trademark) output terminal 10*i* is provided. Where an external display (monitor) is connected through the HDMI output terminal 10*i*, for example, the image displayed on the display (LCD 10*c*) of the electronic apparatus can be displayed on the external display (that is, a display on which the image is displayed is switched from the display to the external display).

It should be noted that although it is omitted in FIG. 1, a USB port, an RGB port, etc., may be provided in the electronic-apparatus body 10*a*.

FIG. 2 shows a system configuration of the electronic apparatus 10 as shown in FIG. 1. As shown in FIG. 2, the electronic apparatus 10 includes a CPU 11, a system controller 12, a RAM (main memory) 13, a graphics processing unit (GPU) 14, a sound controller 15, a BIOS-ROM 16, a wireless LAN module 17, an embedded controller/keyboard controller IC (EC/KBC) 18, etc.

The CPU 11 is a hardware processor configured to control the operation of each of components of the electronic apparatus 10. The CPU 11 executes various programs which are each developed on the RAM 13, which is a volatile memory. The programs which are executed by the CPU 11 include, for example, firmware (small core) including a basic input output system (BIOS) stored in the BIOS-ROM 16, which is a nonvolatile memory.

The system controller 12 is a bridge device configured to connect the CPU 11 and each of the components to each other. The system controller 12 executes communication with each of devices on a low PIN count (LPC) bus.

The GPU 14 is a display controller configured to control the LCD 10*c*, which is used as the display (monitor) of the electronic apparatus 10.

The sound controller 15 is a sound-source device, and outputs audio data to be reproduced to, for example, the speakers 10*g*.

The wireless LAN module 17 is configured to execute wireless communication complying with, for example, IEEE802.11.

The EC/KBC 18 is connected to the LPC bus. The EC/KBC 18 is a power management controller configured to exert an electric-power control of the electronic apparatus 10, and is achieved as a one-chip microcomputer incorporating a keyboard controller which controls, for example, the keyboard 10*d*, the touch pad 10*e*, etc. The EC/KBC 18 has a function of powering on or off the electronic apparatus 10 in accordance with a user's operation on the power supply switch 10*f*.

It should be noted that although it is omitted in FIG. 2, the electronic apparatus 10 is provided with an HDMI control circuit which is an interface configured to output, for example, an HDMI video signal and a digital audio signal, to the external display through the HDMI output terminal 10*i*.

In the embodiment, in order to prevent information leakage which may occur in the case where the electronic apparatus 10 is, for example, stolen or lost, it is assumed that the electronic apparatus 10 does not incorporate an internal storage, for example, a hard disk drive (HDD) or a solid-state drive (SSD).

It should be noted that the electronic-apparatus body 10*a* may include a USB port; however, in this case, it is assumed that in the embodiment, for example, the device which can be connected to the USB port is limited to an input device, for example, a mouse. That is, it is assumed that in order to prevent information leakage, in the electronic apparatus 10 according to the embodiment, an external storage such as a USB memory cannot be used.

The system (thin-client system) including the electronic apparatus 10 according to the embodiment will be described with reference to FIG. 3.

In the embodiment, it is assumed that the electronic apparatus 10 is used in, for example, a management area (for example, an area which needs to be strictly managed in information) of a management server apparatus 20 to be described later.

Figure 3:
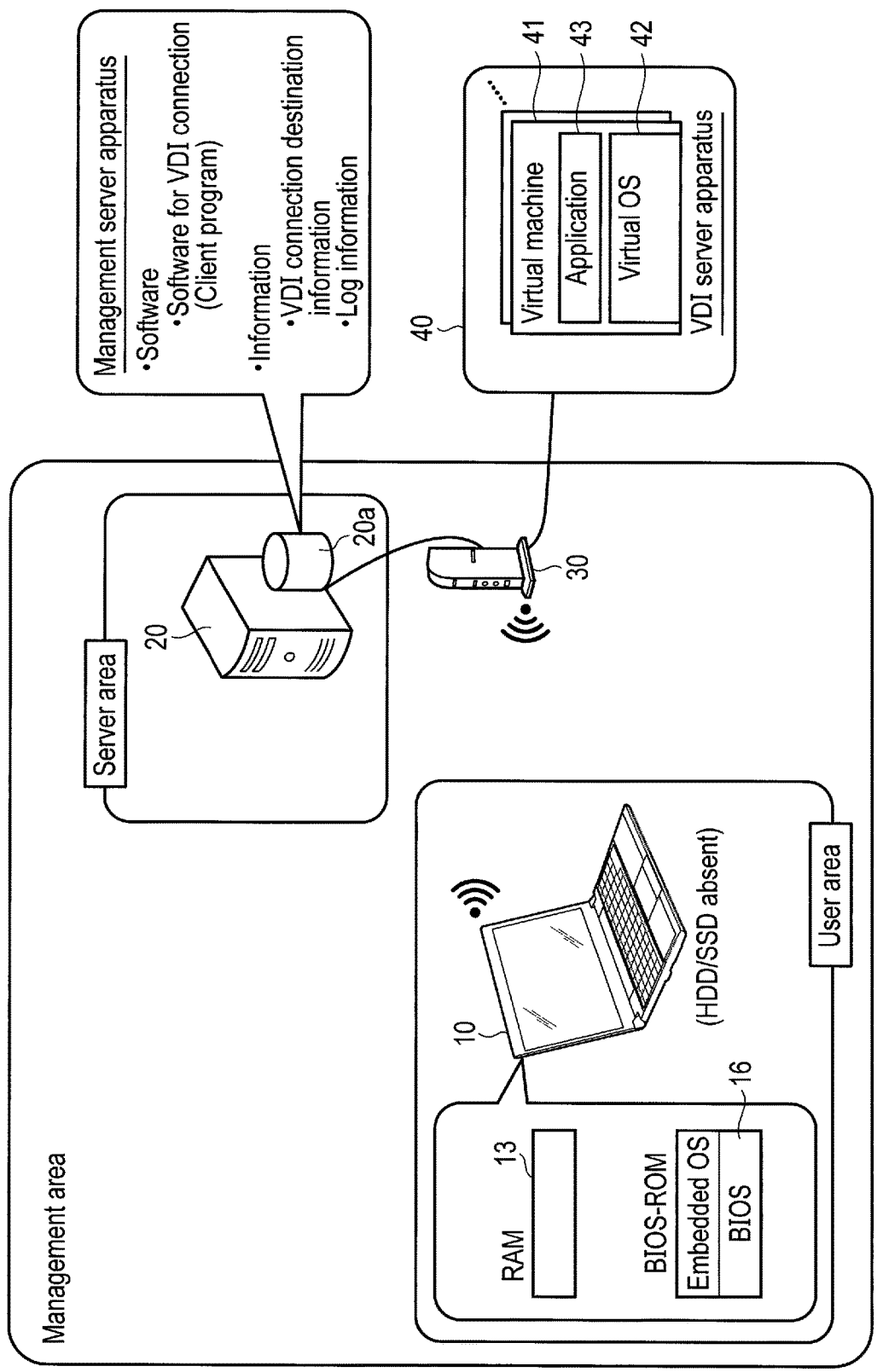
FIG. 3 is a view for explaining an example of a thin-client system including the electronic apparatus.

As shown in FIG. 3, in a server area in the management area, the management server apparatus 20 is placed. A user (for example, a corporate employee) in the management area uses an electronic apparatus 10 to perform an operation. The electronic apparatus 10 can communicate with the management server apparatus 20 through a wireless network such as a wireless LAN. In this case, the electronic apparatus 10 may be connected to the management server apparatus 20 through a wireless LAN router 30. Also, through the wireless network, the electronic apparatus 10 can communicate with a server apparatus 40 configured to provide a virtual desktop environment to plural client terminals including the electronic apparatus 10.

As techniques for achieving desktop virtualization for providing a virtual desktop environment, plural kinds of techniques are present. As one of those techniques, Virtual Desktop Infrastructure (VDI) is known.

It is assumed that in the embodiment, VDI is used as a technique for achieving desktop virtualization. In this case, the server apparatus 40 functions as a VDI server apparatus configured to provide a virtual desktop environment using VDI. The electronic apparatus 10 functions as a VDI client terminal. In the following explanation, the server apparatus 40, which provides a virtual desktop environment, is referred to as a VDI server apparatus 40 as a matter of convenience.

As models which can be applied as the VDI server apparatus 40, a blade PC model, a virtual machine model, a terminal model, etc., are present. For example, in the case where the VDI server apparatus 40 is a virtual machine model, in the VDI server apparatus 40, plural virtual machines 41 are executed. One of those plural virtual machines 41 is assigned to the electronic apparatus 10. Each of the virtual machine 41 includes a virtual OS (client desktop OS) 42 and an application program 43 to be executed on the virtual OS 42. The electronic apparatus 10 may be connected to a single virtual machine 41 on the VDI server apparatus 40 through the wireless LAN router 30.

The electronic apparatus 10 according to the embodiment, as described above, does not include an internal storage, and operates using Virtual Desk top Infrastructure (VDI) of a BIOS base.

In order to achieve VDI of a BIOS base, firmware including BIOS includes a network communication function for connection to a wired or wireless network. The firmware including BIOS, as described above, is stored in the BIOS-ROM (firmware ROM) 16 in the electronic apparatus 10. The firmware includes, for example, BIOS and an embedded OS having a network communication function. BIOS can boot the embedded OS in the BIOS-ROM 16. As BIOS, UEFI BIOS may be applied. The BIOS-ROM 16 may be formed of a flash EEPROM to allow the above firmware to be updated.

The electronic apparatus 10 can communicate with the management server apparatus 20 through the wireless network, using only the firmware in the BIOS-ROM 16.

The management server apparatus 20 has a function of limiting client terminals which can be used in the management area to a group of terminals registered in advance in order to prevent an unauthorized terminal from being used in the management area, i.e., prevent an unauthorized terminal from accessing to the VDI server apparatus 40. Also, the management server apparatus 20 has a function of providing information and a program necessary for communicating with the VDI server apparatus 40 to client terminals each of which is authenticated and identified as an authorized client terminal.

The management server apparatus 20 includes a storage 20a. The storage 20a stores software (Big Core) for VDI connection, VDI connection destination information, etc. The software for VDI connection is a client program for achieving connection to a server apparatus which provides a virtual desktop environment, i.e., the VDI server apparatus 40, and for receiving a virtual desktop image from the VDI server apparatus 40.

It should be noted that the electronic apparatus 10 can download the software for VDI connection (client program) from the management server apparatus 20. In this case, the downloaded software for VDI connection is developed and launched on the RAM 13, whereby the electronic apparatus 10 is connected to the VDI server 40, and allowed to be provided with the virtual desktop environment from the VDI server apparatus 40 (that is, it is allowed to operate under the virtual desktop environment).

Other than a method in which the software for VDI connection is downloaded from the management server apparatus 20 as described above, there can be a method in which the software for VDI connection is stored in the BIOS-ROM 16 in advance. However, in this method, it is necessary to prepare a ROM having a large capacity as the BIOS-ROM 16. Furthermore, in a structure in which a client program is stored in the BIOS-ROM 16 in advance, the kinds of client programs which can be applied are limited.

On the other hand, in the embodiment, by virtue of a structure in which as described above, the software for VDI connection is downloaded from the management server apparatus 20 into the electronic apparatus 10, it is possible to cause an arbitrary kind of client program to be executed on the electronic apparatus 10, simply by changing the kind of the client program to be stored in the storage 20a of the management server apparatus 20.

The VDI connection destination information is information necessary for connection to the VDI server apparatus 40. The VDI connection destination information may include the network address (IP address) of the VDI server apparatus 40 and qualification information (user ID and a password) to log in on the VDI server apparatus 40.

The software for VDI connection is launched to connect the electronic apparatus 10 to the VDI server apparatus 40 through the network, by the embedded OS in the firmware. In this case, the user inputs qualification information (user ID and a password) on a VDI login screen displayed on the display of the electronic apparatus 10. Thereby, the user can log in on the VDI server apparatus 40 by the software for VDI connection (client program).

After the user logs in on the VDI server apparatus 40, the electronic apparatus 10 can receive a virtual desktop image (an image of a virtual desktop) from the VDI server apparatus 40 through the network (the wireless network in this case), by the software for VDI connection. The virtual desktop image is displayed on the display (LCD 10c) of the electronic apparatus 10. Also, the electronic apparatus 10 can transmit information indicating an operation performed by the user using an input device (which will be hereinafter referred to as operation information on the input device) to the VDI server apparatus 40 through the network (the wireless network in this case). The operation information on the input device includes information on an operation on the keyboard 10d, information on an operation on the touch pad 10e, etc.

In such a manner, the software for VDI connection is downloaded from the management server apparatus 20 into the electronic apparatus 10 by the firmware only. Therefore, the electronic apparatus 10 does not need to include an internal storage, and can thus reduce the possibility with which data and a unique program will be illegally used.

It should be noted that the firmware holds connection information (the network address of the management server apparatus 20) for connection to the management server apparatus 20. In this case, since the data amount of the connection information is small, the connection information may be stored in, for example, a trusted platform module (TPM), a specific chip, or the like, which can more reliably keep information in secrecy. Such a structure can improve the security. Furthermore, the connection information may include service set ID (SSID) of the wireless LAN router 30.

In addition, the firmware has a function of automatically powering off the electronic apparatus 10 (which will be hereinafter referred to as an automatic power-off function) if the electronic apparatus 10 is, for example, taken outside the management area and thus disconnected from the network (the wireless network in this case), after connection between the electronic apparatus 10 and the VDI server apparatus 40 is established. It should be noted that as described above, in the case where the electronic apparatus 10 is provided with the virtual desktop environment, the software for VDI connection needs to be developed and launched on the RAM 13. In this case, there is a case where the RAM 13 holds information which may be illegally used if it leaks from the RAM 13. However, if the electronic apparatus 10 is powered off by the above automatic power-off function, the information in the RAM 13 (which is a volatile memory) is all automatically erased. That is, in the embodiment, information (the program and data downloaded from the management server apparatus 20) is all present only on the RAM 13 of the electronic apparatus 10, and can thus be all erased at the same time as applying of a power supply voltage to the RAM 13 is stopped, by powering off the electronic apparatus 10. Therefore, even if the electronic apparatus 10 is taken outside the management area, it is possible to prevent information leakage.

Processing for determining whether the electronic apparatus 10 has been disconnected from the network or not may be executed by the firmware (for example, the embedded OS). As a method for determining whether the electronic apparatus 10 has been disconnected from the network, for example, a method for determining whether or not the electronic apparatus 10 and the VDI server apparatus 40 have been released from connection (VDI connection) between them (whether they have been disconnected from each other) may be applied. Such a VDI connection release (disconnection) occurs, for example, if the electronic apparatus 10 is taken outside the management area (outside a communication range), or the electronic apparatus 10 logs off from the VDI server apparatus 40.

In the case where the electronic apparatus 10 is taken outside the management area, not only the electronic apparatus 10 and the VDI server apparatus 40 but the electronic apparatus 10 and the management server apparatus 20 are disconnected from each other. Therefore, the electronic apparatus 10 periodically communicates with the management server apparatus 20 by the firmware, whereby it may be determined that the VDI connection release has occurred, if the electronic apparatus 10 is unable to communicate with the management server apparatus 20 for a predetermined time period or more. In the case where a GPS sensor is provided in the electronic apparatus 10, it may be determined using the GPS sensor whether the electronic apparatus 10 has been taken outside the management area or not.

Figure 4:
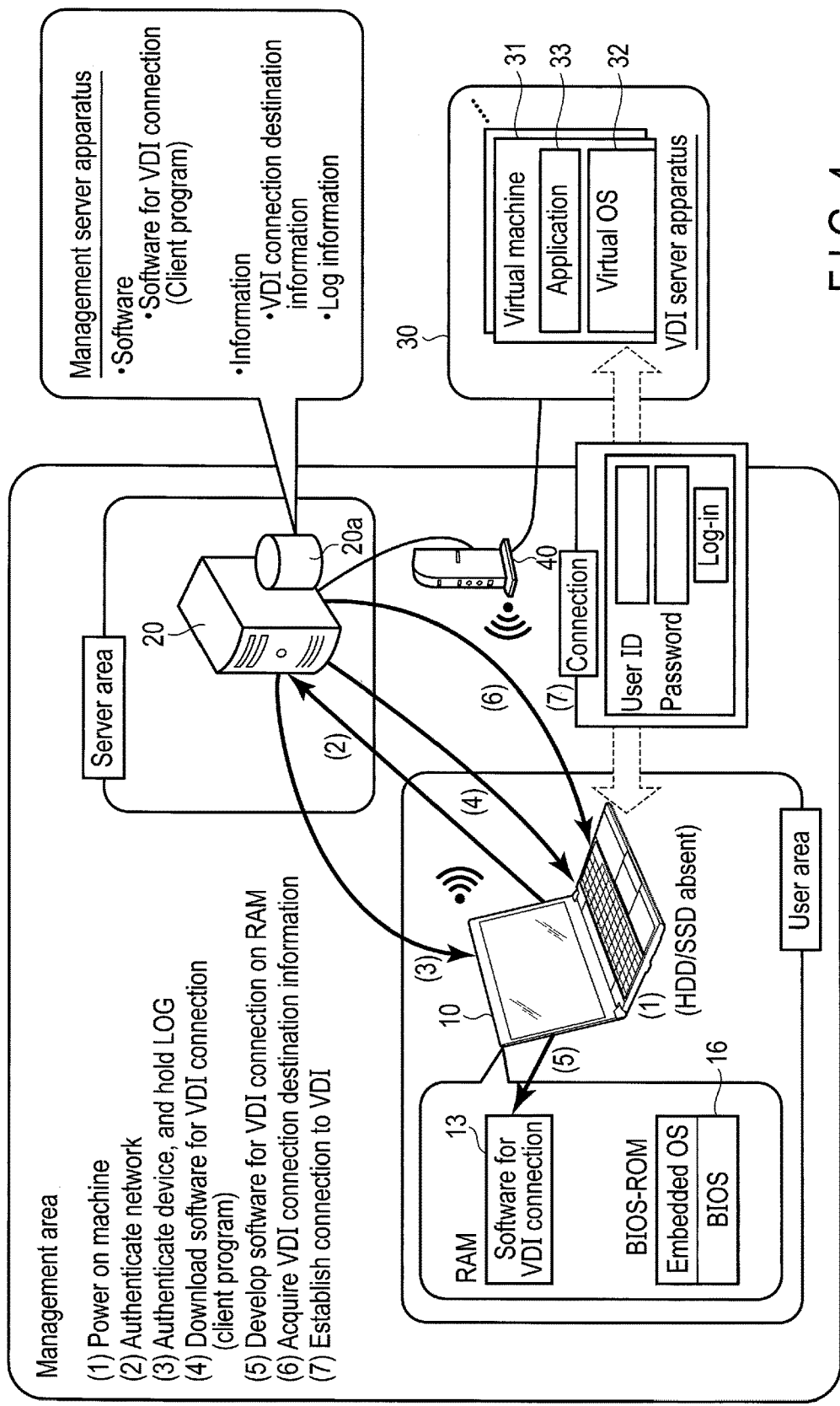
FIG. 4 is a view for explaining the outline of processing for connecting the electronic apparatus and a VDI server apparatus.

Next, the outline of processing for connecting the electronic apparatus 10 and the VDI server apparatus 40 will be explained with reference to FIG. 4.

(1) The electronic apparatus 10 (machine) is powered on by a user's operation on the power supply switch 10f.

(2) The firmware in the electronic apparatus 10 is executed. Communication between the electronic apparatus 10 and the management server apparatus 20 starts, and network authentication processing for determining whether to permit the electronic apparatus 10 to be connected to the management server apparatus 20 through the network or not is executed. If the firmware in the electronic apparatus 10 holds correct connection information (the network address of the management server apparatus 20) for connection to the management server apparatus 20, it is permitted to be connected to the management server apparatus 20 through the network (authentication in the network authentication processing has succeeded).

(3) Then, device authentication processing for preventing use of an unauthorized terminal is executed. In this case, the electronic apparatus 10 transmits to the management server apparatus 20, device information from which the electronic apparatus 10 can be identified, for example, device ID (a serial number or the like) which identifies the electronic apparatus 10 or a certificate which the electronic apparatus 10 has. In the management server apparatus 20, device information related to client terminals which can be used in the thin-client system is registered in advance. The management server apparatus 20 determines whether the device information transmitted from the electronic apparatus 10 is coincident with any of the device information registered in advance or not (device authentication processing). The management server apparatus 20 stores log information indicating whether authentication in the device authentication processing has succeeded or not, in the storage 20a in the management server apparatus 20. Also, the electronic apparatus 10 may make the log information indicating whether the authentication has succeeded or not stored in the RAM 13 of the electronic apparatus 10.

(4) If the authentication in the device authentication processing has succeeded, the electronic apparatus 10 downloads the software for VDI connection (client program) from the management server apparatus 20.

(5) The electronic apparatus 10 develops the software for VDI connection on the RAM 13.

(6) The electronic apparatus 10 acquires VDI connection destination information from the management server apparatus 20. In this case, the management server apparatus 20 transmits to the electronic apparatus 10, VDI connection destination information related to registered device information which is coincident with the device information from the electronic apparatus 10. The VDI connection destination information, as described above, includes the network address (IP address) of the VDI server apparatus 40. Furthermore, the VDI connection destination information may include qualification information (user ID and a password) for logging in on the VDI server apparatus 40. It should be noted that the VDI connection destination information is acquired from the management server apparatus 20 if the electronic apparatus 10 is first started. Thereafter, it is checked (determined) at the time of executing the device authentication processing whether the VDI connection destination information is present or absent, and if the VDI connection destination information is updated, it is re-acquired.

(7) The electronic apparatus 10 launches (executes) the software for VDI connection on the RAM 13 in order to connect the electronic apparatus 10 and the VDI server apparatus 40. The electronic apparatus 10 transmits a connection request (login request) to the VDI server apparatus 40, using the network address (IP address) included in the VDI connection destination information. In this case, the user inputs the user ID and password which are included in the VDI connection destination information to a user ID input field and a password input field on a VDI login screen provided by the VDI server apparatus 40. Thereby, the user can log in on the VDI server apparatus 40. If the user logs in on the VDI server apparatus 40, connection (VDI connection) between the electronic apparatus 10 and the VDI server apparatus 40 is established, and the electronic apparatus 10 can operate under the virtual desktop environment provided by the VDI server apparatus 40.

Figure 5:
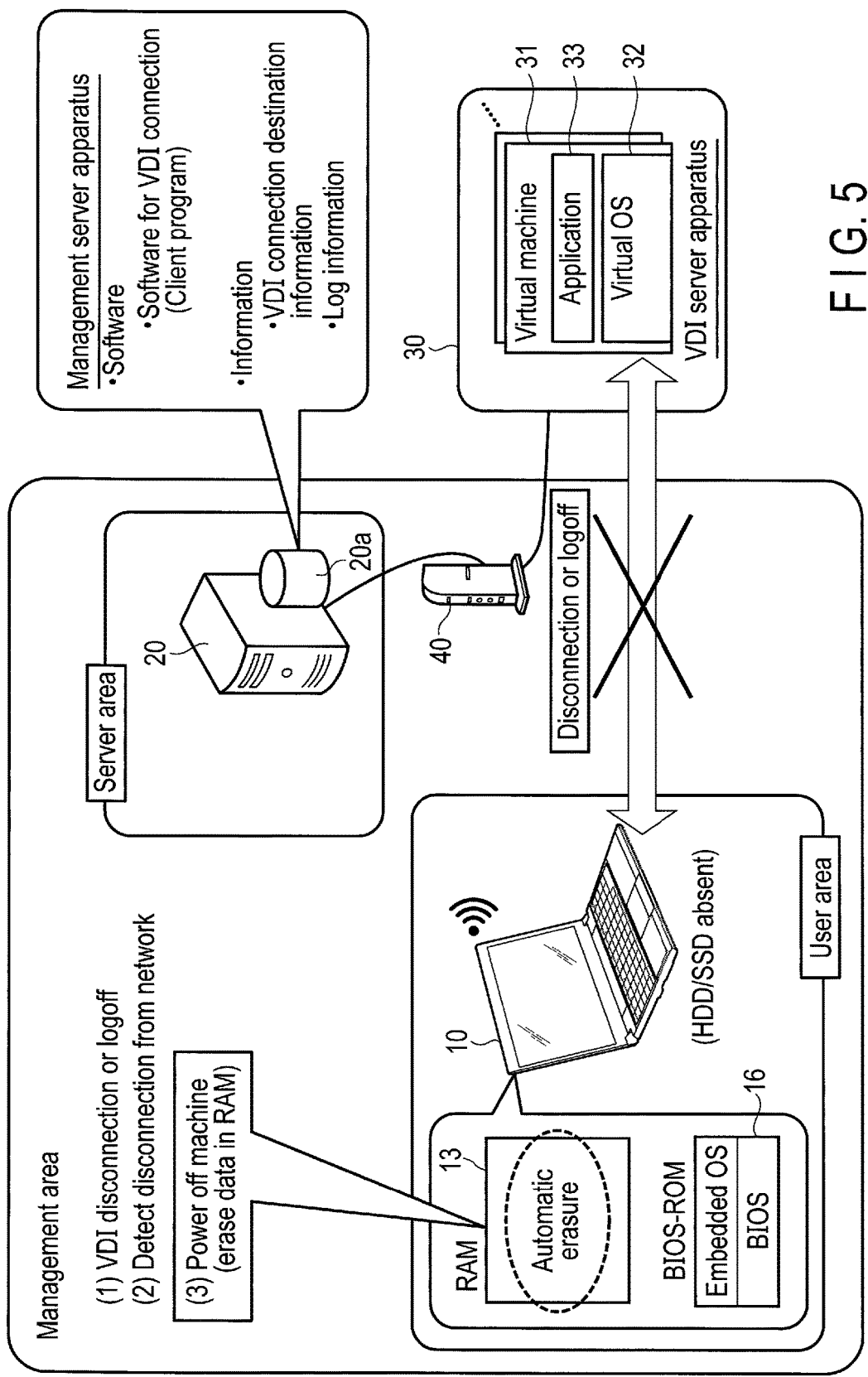
FIG. 5 is a view for explaining the outline of processing to be executed when the electronic apparatus is disconnected from a network.

Next, an outline of processing to be executed when the electronic apparatus 10 is disconnected from the network will be explained with reference to FIG. 5.

(1) For example, if the electronic apparatus 10 is taken outside the management area, it is disconnected from the VDI server apparatus 40 (VDI disconnection). In this case, the electronic apparatus 10 enters a logoff state in which it is stopped from receiving screen information (virtual desktop image) from the VDI server apparatus 40.

(2) The electronic apparatus 10 detects that the electronic apparatus 10 has been disconnected from the network by the firmware (for example, the embedded OS).

(3) If the electronic apparatus 10 detects that the electronic apparatus 10 has been disconnected from the network, an OFF signal (power-off command) is transmitted to a power-supply controller in the electronic apparatus 10 to power off the electronic apparatus 10. Thereby, information in the RAM 13 is automatically erased.

It should be noted that also, if the user of the electronic apparatus 10 performs a logoff operation to cause the electronic apparatus 10 to be in the logoff state, the electronic apparatus 10 may be automatically powered off.

Figure 6:
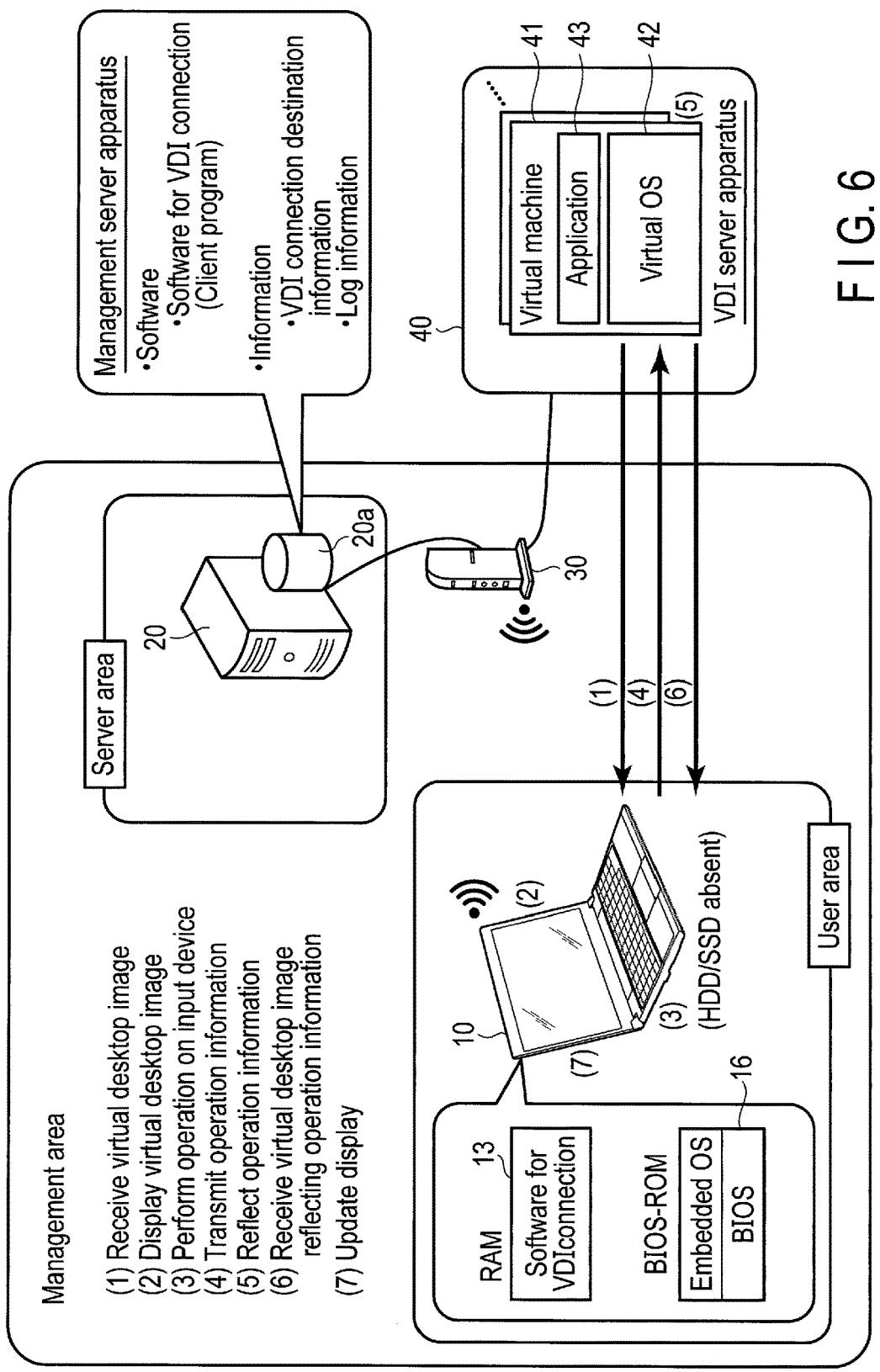
FIG. 6 is a view for explaining the outline of processing to be executed between the electronic apparatus and the VDI server apparatus in the case where they are connected to each other.

Next, an outline of processing to be executed between the electronic apparatus 10 and the VDI server apparatus 40 in the case where they are connected to each other will be explained with reference to FIG. 6.

(1) As explained with reference to FIG. 4, if the electronic apparatus 10 and the VDI server apparatus 40 are connected to each other (VDI connection), the electronic apparatus 10 receives a virtual desktop image from the VDI server apparatus 40.

(2) In this case, on the display (LCD 10*c*) of the electronic apparatus 10, the received virtual desktop image (screen) is displayed.

(3) The user can perform an operation on the virtual desktop image displayed on the display of the electronic apparatus 10, using an input device (for example, the keyboard 10*d*, the touch pad 10*e*, or the like).

(4) If the user performs such an operation using the input device, operation information on the input device is sent to the VDI server apparatus 40.

(5) If the operation information on the input device is sent from the electronic apparatus 10, for example, the virtual machine 41 (for example, the virtual OS 42) assigned to the electronic apparatus 10 executes processing for producing a virtual desktop image which reflects the operation information. It should be noted that it is assumed that the virtual desktop image in the embodiment includes various images which are displayed on the display of the electronic apparatus 10, such as a desktop image provided by the virtual OS 42 and an application image provided by the application program 43, which is executed on the virtual OS 42.

(6) The electronic apparatus 10 receives from the VDI server apparatus 40, the virtual desktop image produced in the virtual machine 41 (the virtual desktop image reflecting the operation information).

(7) On the display of the electronic apparatus 10, the received virtual desktop image is displayed.

As described above, while the connection between the electronic apparatus 10 and the VDI server apparatus 40 is maintained, the above processing is repeatedly carried out, whereby the virtual desktop image (virtual desktop screen) displayed on the display of the electronic apparatus 10 is updated in accordance with the user's operation on the input device, and the user can use the electronic apparatus 10 (client terminal) under the virtual desktop environment.

It should be noted that as explained with reference to FIG. 6, in the thin-client system, information on the operation performed on the electronic apparatus 10 (the operation information on the input device) while the electronic apparatus 10 and the VDI server apparatus 40 are kept connected to each other is all sent to the VDI server apparatus 40 (the virtual machine 41).

Thus, on the electronic apparatus 10, the user cannot perform (change), using the input device, setting of hardware of the electronic apparatus 10, for example, switching between an available state/an unavailable state of the touch pad 10*e*, adjustment of the brightness of the display (LCD 10*c*), etc.

Furthermore, in the case where the electronic apparatus 10 operates under a desktop environment of a versatile OS, the desktop screen provided by the versatile OS shows the state of the hardware of the electronic apparatus 10 such as a connecting condition of the electronic apparatus 10 to the network, the remaining amount of power in a battery, etc. However, if the electronic apparatus 10 operates under the virtual desktop environment, a virtual desktop image (screen) is displayed on the display of the electronic apparatus 10 at all times. Inevitably, the user cannot confirm the state of each hardware of the electronic apparatus 10 from the image displayed on the display.

In view of the above, the embodiment is provided to have a function (hereinafter referred to as an indicator-displaying function) of displaying, on the display (screen), an indicator for changing the setting of the hardware of the electronic apparatus 10 (i.e., for controlling the hardware) in accordance with the operation performed by the user using the input device, even during displaying of the virtual desktop image.

FIG. 7 is a block diagram showing a functional configuration of the indicator-displaying function. An operation determination module 101, a state acquisition module 102, a display processing module 103 and an HW control module 104 as shown in FIG. 7 are functional modules which are realized by, for example, the embedded OS (firmware).

It is assumed that in the indicator-displaying function in the embodiment, if a predetermined operation (hereinafter referred to as an indicator-displaying operation) is accepted by the input device, the above indicator is displayed on the display of the electronic apparatus 10.

The operation determination module 101 includes instructions for acquiring operation information on a user's operation accepted by the input device (operation information on the input device). The operation determination module 101 includes instructions for determining based on the acquired operation information, whether the above indicator-displaying operation has been performed by the user or not.

The state acquisition module 102 includes instructions for acquiring information on the present states of hardware of the electronic apparatus 10 if it is determined that the indicator-displaying operation has been performed by the user. The acquired information on the states of the hardware of the electronic apparatus 10 includes, for example, information on the connecting condition of the electronic apparatus 10 to the network, information on the remaining amount of electric power in the battery, information indicating whether the touch pad 10e is available or unavailable, the set value of the brightness of the display, etc.

The display processing module 103 includes instructions for displaying the indicator for changing the settings of the hardware of the electronic apparatus 10 (i.e., for controlling the hardware) on the display (LCD 10c) of the electronic apparatus 10. It should be noted that the indicator indicates the states of the hardware of the electronic apparatus 10.

Also, supposing the virtual desktop image is displayed in a first layer, the indicator is displayed in a second layer which is put on a higher priority than the first layer. In other words, the indicator is displayed forward of the virtual desktop image in order that it be visibly recognized by the user. It should be noted that the indicator displayed on the display of the electronic apparatus 10 will be described in detail later.

The HW control module 104 includes instructions for executing processing for changing the settings of the hardware of the electronic apparatus 10 (i.e., processing for controlling the hardware), in the case where an operation which is accepted by the input device, with the indicator displayed on the display of the electronic apparatus 10, is an operation for changing the settings of the hardware of the electronic apparatus 10 (which will be hereinafter referred to as an HW control operation). It is assumed that the HW control operation is an operation which varies in accordance with (the kind of) hardware of the electronic apparatus 10 the setting of which should be changed.

That is, in the embodiment, it is possible to change the setting of hardware of the electronic apparatus 10 through the indicator displayed by the indicator-displaying function.

The procedure of processing by the electronic apparatus 10 with respect to the indicator-displaying function will be explained with reference to the flowchart of FIG. 8.

Suppose the electronic apparatus 10 is connected to the VDI server apparatus 40, and operates under the virtual desktop environment. In this case, also, suppose on the display of the electronic apparatus 10, a virtual desktop image is displayed.

First, the electronic apparatus 10 monitors a user's operation which is accepted by the input device, to determine whether the user has performed an indicator-displaying operation (i.e., whether the user's operation is an indicator-displaying operation) or not (block B1).

It should be noted that the indicator-displaying operation includes, for example, an operation for pressing a specific key (for example, the "Fn" key) on the keyboard 10d.

If it is determined that the user has performed an indictor-displaying operation (YES in block B1), the electronic apparatus 10 acquires information on the present states of the hardware of the electronic apparatus 10 (the present state of each of the hardware) (block B2). The information on the states of the hardware of the electronic apparatus 10 can be acquired using, for example, the firmware (BIOS and embedded OS) stored in BIOS-ROM 16.

Next, the electronic apparatus 10 displays the indicator indicating the states of the hardware of the electronic apparatus 10 in block B2, on the display (LCD 10c) of the electronic apparatus 10 (block B3). It is assumed that the indicator is produced by inserting the states of the hardware of the electronic apparatus 10, into, for example, the format of the indicator which is prepared in advance (by causing the states of the hardware to be reflected in the format). Furthermore, the indicator is displayed in a layer which is put on a higher priority than (i.e., the indicator is displayed forward of) the virtual desk top image in order that it be visibly recognized by the user.

It is assumed that the electronic apparatus 10 continuously displays the indicator while the indicator-displaying operation is being performed (i.e., while the "Fn" key on the keyboard 10d is being pressed).

It should be noted that in the case where the indicator is displayed as described above, the user can perform the above HW control operation. In other words, the user can give an instruction to change the setting of hardware of the electronic apparatus 10, by performing a specific operation while pressing the "Fn" key on the keyboard 10d (i.e., while the indicator is being displayed).

Thus, the electronic apparatus 10 monitors a user's operation which is accepted by the input device, to determine whether the user has performed the HW control operation (i.e., whether the user's operation is the HW control operation) or not (block B4).

It should be noted that the HW control operation includes an operation for pressing a specific key (other than the "Fn" key) on the keyboard 10d, which is assigned to hardware the setting of which is to be changed. Furthermore, it is assumed that in the HW control operation, different keys are assigned to respective hardware the settings of which can be changed.

If it is determined that the user has performed the HW control operation (YES in block B4), the electronic apparatus 10 executes processing for changing the setting of hardware of the electronic apparatus 10, based on the HW control operation (block B5). The HW control processing will be explained in detail later.

It should be noted that in block B1, if it is determined that the user has not performed the indicator-displaying operation (No in block B1), the processing as shown in FIG. 8 ends. It should be noted that if an operation other than the indicator-displaying operation is performed, information on the operation (operation information on the input device) is transmitted to the VDI server apparatus 40 to update the virtual desktop image (virtual desktop screen) displayed on the display of the electronic apparatus 10.

Furthermore, in block B4, if it is determined that the user has not performed the HW control operation (NO in block B4), the processing as shown in FIG. 8 ends.

It should be noted that if the indicator-displaying operation ends, that is, a finger is separated from the "Fn" key on the keyboard 10d, the indicator displayed on the display of the electronic apparatus 10 is made undisplayed (hidden).

Furthermore, as described above, during the indicator-displaying operation, the indicator is continuously displayed. However, it is assumed that while the indicator is being displayed, an operation other than the HW control operation is not permitted (that is, information on the operation is not sent to VDI sever apparatus 40).

Next, the procedure of the HW control processing (i.e., the processing in block B5 as shown in FIG. 8) will be described with reference to the flowchart of FIG. 9. The HW control processing is processing to be executed in the case where the user performs the HW control operation, with the indicator displayed as described above.

It is assumed that the HW control operation is an operation for pressing a specific key on the keyboard 10*d* which is assigned to hardware the setting of which is to be changed. That is, by performing the HW control operation, the user can select hardware the setting of which is to be changed. In the following explanation, the hardware selected in the HW control operation is referred to as selected HW. Also, a specific key (a key assigned to the selected HW) pressed by the user in the HW control operation is referred to as an HW control key as a matter of convenience.

In the case where the HW control processing is executed, the indicator is displayed on the display of the electronic apparatus 10. In this HW control processing, of the present states (set values) of hardware of the electronic apparatus 10, the present set value of the selected HW is displayed (indicated) in the above indicator (block B11).

In the embodiment, after the present set value of the selected HW is displayed in the indicator in block B11, the user can designate the changed set value of the selected HW by re-pressing the HW control key.

Thus, if the processing of block B11 is executed, the electronic apparatus 10 monitors a user's operation which is accepted by the input device, to thereby determine whether or not the HW control key has been re-pressed by the user (block B12).

If it is determined that the HW control key has been re-pressed by the user (YES in block B12), the electronic apparatus 10 changes the set value displayed in the indicator (block B13). In this case, in the indicator, a changed set value which the user has designated by pressing the HW control key is displayed.

On the other hand, if it is determined that the HW control key has not been pressed by the user (NO in block B12), the processing of block B13 is not executed, and the value displayed in the indicator in block B11 is maintained.

Next, the electronic apparatus 10 monitors a user's operation which is accepted by the input device to determine whether or not the finger has been separated from the "Fn" key after pressing the "Fn" key to display the indicator (that is, whether or not the indicator-displaying operation has ended) (block B14). This separation of the finger from the "Fn" key (i.e., release of the "Fn" key from the pressed state) is an operation to cause the set value displayed in the indicator (the changed set value designated by the user) to be reflected as the set value of the selected HW.

If it is determined that the finger has not been separated from the "Fn" key (NO in block B14), the processing to be executed is returned to the processing of block B12, and processing from block B12 onward is repeated. That is, in the HW control processing as shown in FIG. 9, as long as the indicator is kept displayed, the changed set value of the selected HW can be designed by pressing the HW control key a number of times. It should be noted that a concrete example of the HW control operation to be performed in the case of changing the setting of the selected HW will be described later.

By contrast, if it is determined that the finger has been separated from the "Fn" key (YES in block B14), in the display of the electronic apparatus 10, the indicator is made undisplayed.

At this time, the electronic apparatus 10 determines whether an instruction to change the set value of the selected HW has been given or not (block B15). In block B15, if the present value of the selected HW which is displayed in the indicator in block B11 is different from the set value displayed in the indicator when the finger is separated from the "Fn" key (i.e., the changed set value designated by the user), it is determined that the instruction to change the set value of the selected HW has been given. By contrast, if the present value of the selected HW which is displayed in the indicator in block B11 is equal to that the set value displayed in the indicator when the finger is separated from the "Fn" key, it is determined that the instruction to change the set value of the selected HW has not been given.

If it is determined that the instruction to change the set value of the selected HW has been given (YES in block B15), the electronic apparatus 10 changes the present set value of the selected HW to the changed set value designated by the user (block B16).

Figure 9:
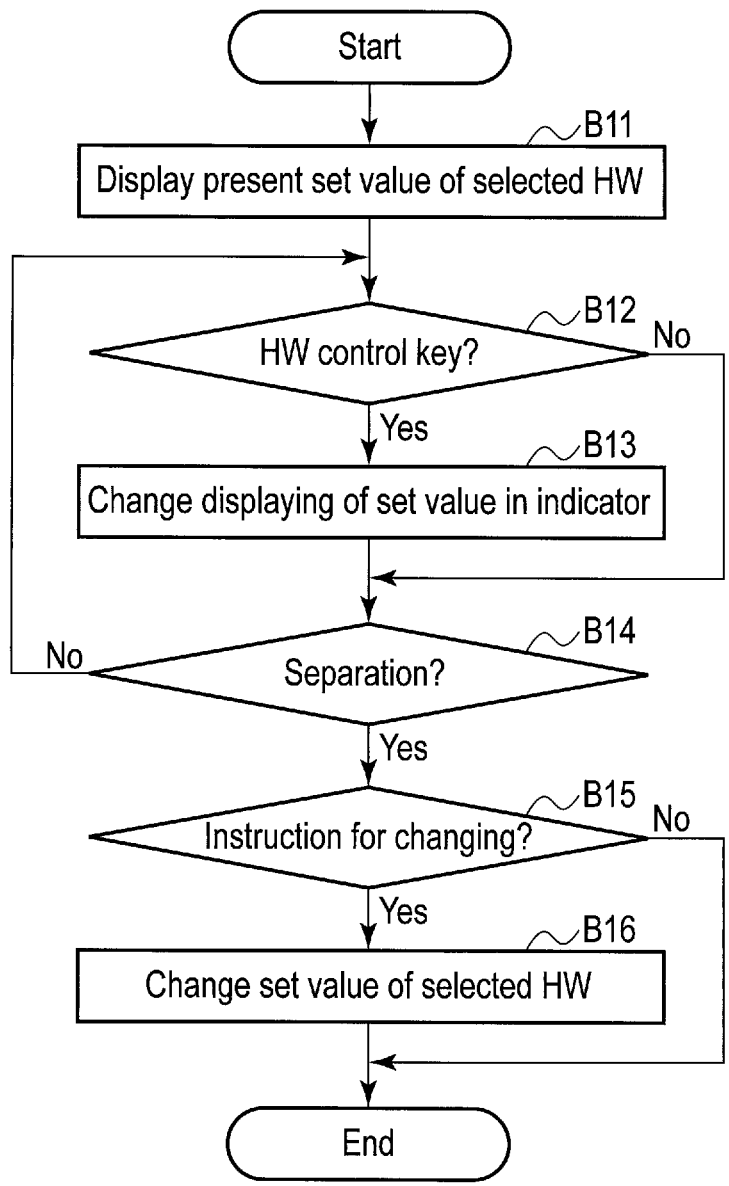
FIG. 9 is a flowchart showing an example of the procedure of an HW control processing.

By contrast, if it is determined that the instruction to change the set value of the selected HW has not been given (NO in block B15), the processing as shown in FIG. 9 ends without executing the processing of block B16 (that is, the present set value of the selected HW is maintained).

Next, the indicator displayed by the indicator-displaying function will be explained. In the following explanation, it is assumed that the hardware of the electronic apparatus 10 includes, for example, the display (LCD 10*c*), the touch pad 10*e*, the speaker 10*g*, the wireless LAN module 17, the battery, the external display, etc.

As described above, if the indicator-displaying operation is performed by the user, with the virtual desktop image displayed, the indicator is displayed on the display (LCD 10*c*) of the electronic apparatus 10. In this case, the indicator is displayed forward of the virtual desktop image.

FIG. 10 shows an example of a state where an indicator 200 is displayed on the display of the electronic apparatus 10. As shown in FIG. 10, the indicator 200 is shaped in the form of, for example, a bar, and displayed in, for example, an upper area of the display of the electronic apparatus 10.

The indicator 200 displayed on the display of the electronic apparatus 10 will be specifically explained with reference to FIG. 11. It should be noted that FIG. 11 shows an example of the indicator 200 (the indicator displayed in block B3 as shown in FIG. 8) which is displayed by the indicator-display operation performed by the user (by pressing the "Fn" key).

As shown in FIG. 11, the indicator 200 includes first to fifth areas 201 to 205 to indicate present states of the hardware of the electronic apparatus 10.

In the first area 201, for example, marks 201*a* and 201*b* are displayed; and the mark 201*a* indicates a connecting condition of the electronic apparatus 10 to the wireless network (i.e., the state of the wireless LAN module 17), and the mark 201*b* indicates the remaining amount of electric power in the battery (the state of the battery).

Referring to FIG. 11, the mark 201*a* indicates that the electronic apparatus 10 is wirelessly connected to the network (for example, it can communicate with the VDI server apparatus 40), and also indicates the intensity of the communication (radio field intensity). It should be noted that although FIG. 11 shows that the mark 201a indicates that the electronic apparatus 10 is wirelessly connected to the network, in the case where the electronic apparatus 10 is connected to the network through wire, the mark 201a is displayed in a form indicating that the electronic apparatus 10 is connected to the network through wire (that is, this form is different from the form of the mark 201a as shown in FIG. 11). Similarly, if the electronic apparatus 10 is not connected to the network, the mark 201a is displayed in a form indicating that the electronic apparatus 10 is not connected to the network.

Furthermore, referring to FIG. 11, the mark 201b indicates that the remaining amount of electric power in the battery of the electronic apparatus 10 is 74%. It should be noted that although FIG. 11 shows that the mark 201b indicates the remaining amount of electric power in the battery of the electronic apparatus 10, in the case where the battery of the electronic apparatus 10 is being charged with electric power supplied from the external power supply device, the mark 201b is displayed in a form indicating that the battery is being charged (this form is different from the form of the mark 201b as shown in FIG. 11).

In the second area 202, a mark 202a indicating the present value (available state/unavailable state) of the touch pad 10e is displayed. Referring to FIG. 11, the mark 202a indicates that the touch pad 10e is set available. Also, in the second area 202, "F9" is displayed close to the mark 202a. "F9" means that a key on the keyboard which is applied as an HW control key for causing the touch pad 10e to be available or unavailable in a switching manner is a key labeled "F9" (hereinafter referred to as "F9" key).

In the third area 203, a mark 203a is displayed which indicates the present set value (volume) of the speakers 10g. In order to indicate the volume of the speakers 10g, the mark 203a is provided such that its area increases or decreases in accordance with the variation of the volume (set value) of the speakers 10g. Also, in the third area 203, "3" and "4" are indicated on the left side and right side of the mark 203a, respectively. "3" means that a key on the keyboard which is provided as an HW control key for decreasing the volume of the speakers 10g is a key labeled "3" (hereinafter referred to as "3" key). "4" means that a key on the keyboard which is provided as an HW control key for increasing the volume of the speakers 10g is a key labeled "4" (hereinafter referred to as "4" key).

In the fourth area 204, a mark 204a is displayed which indicates the present set value (brightness) of the display. In order to indicate the brightness of the display, the mark 204a is provided such that with respect to members surrounding a circular center portion of the mark 204a, the number of lit members increases or decreases in accordance with the variation of the brightness (set value) of the display. Also, in the fourth area 204, "F6" and "F7" are indicated on the left side and right side of the mark 204a, respectively. "F6" means that a key on the keyboard which is applied as an HW control key for decreasing the brightness of the display is a key labeled "F6" (hereinafter referred to as "F6" key). "F7" means that a key on the keyboard which is applied as an HW control key for increasing the brightness of the display is a key labeled "F7" (hereinafter referred to as "F7" key).

In the fifth area 205, a mark 205a is displayed which indicates the present set value (set state) of the external display. Referring to FIG. 11, the mark 205a indicates that no image is made to be displayed by the external display (the external display is not connected to the electronic apparatus 10). Also, in the fifth area 205, "F5" is indicated on the right side of the mark 205a. "F5" means that where the external display is connected to the electronic apparatus 10, a key on the keyboard which is applied as an HW control key for changing setting for displaying of an image on the external display is a key labeled "F5" (hereinafter referred to as "F5" key).

It should be noted that the indicator 200 (the marks displayed therein) as shown in FIG. 11 is displayed based on the present states (set values) of hardware of the electronic apparatus 10.

Also, the indicator 200 is continuously displayed while the user is pressing the "Fn" key on the keyboard 10d.

In such a manner, while the indicator 200 is being displayed on the display of the electronic apparatus 10 (that is, while the user is pressing "Fn" key), the user can perform an operation (HW control operation) for pressing an HW control key to select hardware to which the HW control key is assigned, and change the setting of the selected hardware (selected HW).

The HW control operation to be performed by the user will be specifically explained. The explanation refers to the case where the HW control operation is performed to effect switching between the available state and unavailable state of the touch pad 10e. It should be noted that as explained with reference to FIG. 11, suppose the touch pad 10e is set available.

It should be noted that as described above, the HW control key for switching between the available state/unavailable state of the touch pad 10e is the "F9" key. In this structure, in order to switch the state of the touch pad 10e between the available state/unavailable state, while pressing the "Fn" key, the user performs an operation for pressing the "F9" key (the HW control operation).

In this case, the touch pad 10e is selected, and the present set value (state) of the touch pad 10e is displayed in the indicator 200. In this case, in the indicator 200, as shown in FIG. 12, marks 211 and 212 are displayed; and the mark 211 indicates that the touch pad 10e is available (that is, the set value of the touch pad 10e is a value corresponding to the available state), and the mark 212 indicates that the touch pad 10e is unavailable (that is, the set value of the touch pad 10e is a value corresponding to the unavailable state). Since as described above, the touch pad 10e is set available, in the indicator 200, the mark 211 is more conspicuously highlighted than the mark 212. It should be noted that the mark 211 has the same shape as the mark 202a as shown in FIG. 11.

In order to switch the state of the touch pad 10e between the available state/the unavailable state, while pressing the "Fn" key, the user re-presses the "F9" key (HW control operation). In this case, in the indicator 200, the mark 212 is more conspicuously highlighted than the mark 211 as shown in FIG. 13 (that is, displaying of the set value in the indicator 200 is changed). In such a manner, the user can designate the unavailable state of the touch pad 10e.

In this state, if the finger is separated from the "Fn" key, as described above, the indicator 200 is made undisplayed. At this time, the touch pad 10e is set unavailable (that is, the setting of the touch pad 10e is changed).

Thereafter, if the "Fn" key is re-pressed, the indicator 200 is displayed as shown in FIG. 14. In the indicator 200 as shown in FIG. 14, the mark 202a displayed in the second area 202 means that the touch pad 10e is set unavailable.

It should be noted that as explained with reference to FIG. 13, after designating the unavailable state of the touch pad 10e, the user can designate the available state of the touch pad 10e by re-pressing the "F9" key. In such a manner, if the finger is separated from the "Fn" key after designating the available state of the touch pad 10e, the setting of the touch pad 10e is not changed, and the touch pad 10e is kept available.

The above switching between the available state/unavailable state of the touch pad 10e may be performed using either the firmware or a driver for the touch pad 10e.

Although the above explanation refers to the case of switching between the available state/unavailable state of the touch pad 10e, the settings of other hardware can be changed in the same manner as that of the touch pad 10e.

For example, in the case of changing the brightness of the display, the user presses the "F7" key (HW control operation), which is an HW control key for increasing the brightness of the display, while pressing the "Fn" key. In this case, the display (LCD 10c) is selected, and as shown in FIG. 15, the indicator 200a indicates the set value of the present brightness of the display. It should be noted that the indicators 200a to 200c as shown in FIG. 15 are shown as changes of the displayed state of the indicator 200 each of which occurs when the user presses an HW control key (that is, the user designates a set value of the brightness of the display). If the set value of the brightness of the display is set to fall within the range of 1 to 8, the indicator 200a indicates that the set value of the brightness of the display is 5. It should be noted that the greater the set value, the higher the brightness of the display.

In order to increase the brightness of the display, the user re-presses the "F7" key, while pressing the "Fn" key. As a result, 1 is added to the present set value of the brightness of the display, and the indicator 200b displays the set value to which 1 has been added (6 in this example). Furthermore, if the "F7" key is re-pressed, 1 is further added to the set value of the brightness of the display which is displayed in the indicator 200b, and the indicator 200c displayed the set value (7 in this example) to which 1 has been added.

In this state, if the finger is separated from the "Fn" key, as described above, the indicator 200 is made undisplayed, and the set value of the brightness of the display is changed to 7.

Figure 16:
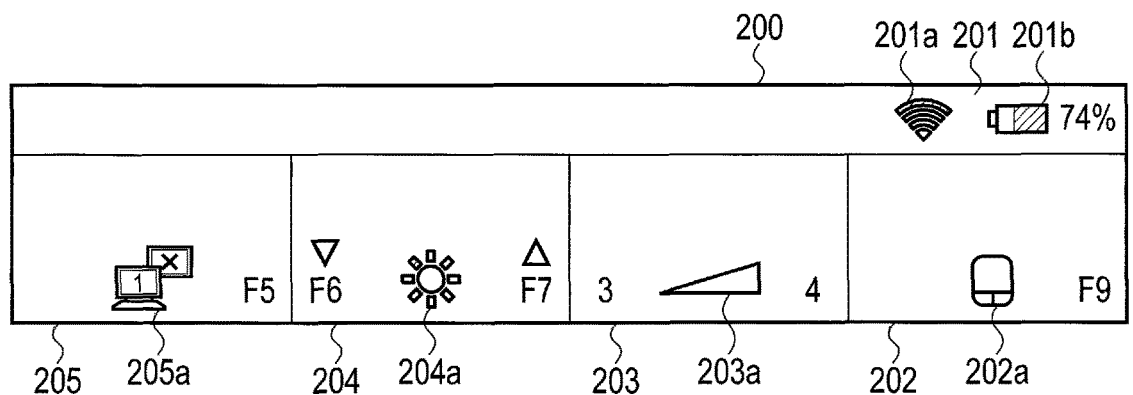
FIG. 16 is a view showing an example of indication of the indicator after the set value of the brightness of the display is changed.

In this case, if the "Fn" key is re-pressed, the indicator 200 as shown in FIG. 16 is displayed. In the indicator 200 as shown in FIG. 16, a mark 204a displayed in the fourth area 204 indicates that the set value of the brightness of the display is 7.

Although the above explanation refers to the case of increasing the brightness of the display, it is also possible to decrease the brightness of the display by pressing the "F6" key, not the "F7" key.

In the embodiment, it is possible to change the set value of the brightness of the display by pressing the "F6" key and "F7" key, which are assigned as HW control keys for decreasing and increasing the brightness of the display, respectively.

Also, it is possible to change the set value of the volume of the speakers 10g by pressing "3" and "4" keys which are assigned as HW control keys for decreasing and increasing the volume of the speakers 10g, respectively, as well as the set value of the brightness of the display using the "F6" key and the "F6" key.

Figure 17:
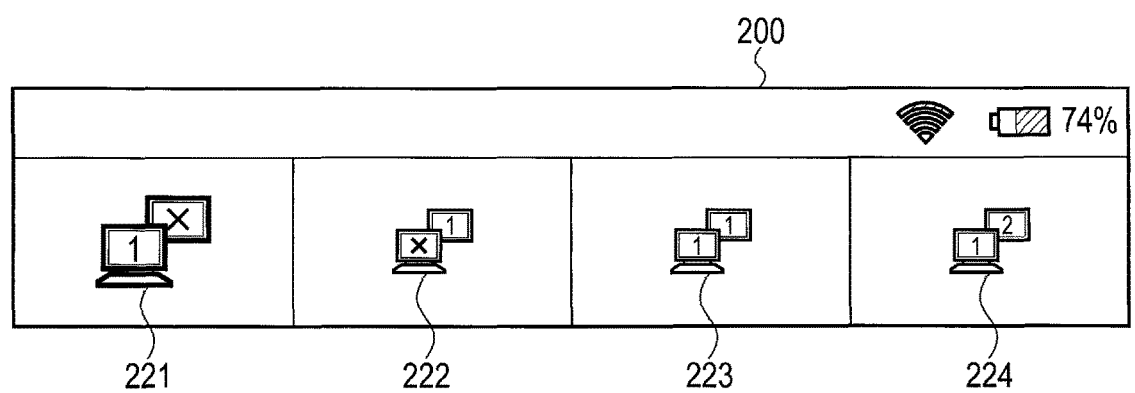
FIG. 17 is a view showing an example of an indication of the indicator in the case where the indicator indicates the present set state of the external display.

Furthermore, for example, in the case of changing the setting of displaying an image in the external display (which will be hereinafter referred to as the setting of the external display), while pressing the "Fn" key, the user presses the "F5" key (HW control operation), which is an HW control key for changing the setting of the external display. In this case, the external display is selected, and as shown in FIG. 17, marks 221 to 224 are displayed in the indicator 200, and are each provided to indicate the set value (set state) of the external display.

The mark 221 is a mark indicating that the display of the electronic apparatus 10 is made to display an image, whereas the external display is not made to display an image. The mark 222 is a mark indicating that the display of the electronic apparatus 10 is not made to display an image, whereas the external display is made to display an image. The mark 223 is a mark indicating that the display of the electronic apparatus 10 and the external display are made to display the same image. The mark 224 is a mark indicating that the display of the electronic apparatus 10 and the external display are made to display different images.

As described above, in the case where the external display is set not to display an image, the mark 211 is more conspicuously highlighted than the other marks 222 to 224 in the indicator 200.

In the case of switching the setting of the external display, the user re-presses the "F5" key, while pressing the "Fn" key. Thereby, the user can designate a state (set value) in which the external display is set to display an image, without permitting the display of the electronic apparatus 10 to display an image. In this case, in the indicator 200, the mark 222 is highlighted.

It should be noted that it is possible to designate another state of the external display by pressing the "F5" key a number of times. To be more specific, if the "F5" key is further pressed, with the mark 222 highlighted, a state (set value) is designated in which the display of the electronic apparatus 10 and the external display are set to display the same image, and the mark 223 is highlighted in the indicator 200. Furthermore, if the "F5" key is further pressed, with the mark 223 highlighted, a state (set value) is designated in which the display of the electronic apparatus 10 and the external display are set to display different images, and the mark 224 is highlighted in the indicator 200.

For example, if the finger is separated from the "F5" key, with the mark 222 highlighted in the indicator 200, the indicator 200 is made undisplayed, and the setting of the external display is changed such that the display of the electronic apparatus 10 is made not to display an image and the external display is made to display an image.

Although the above explanation refers to the case of changing the settings of the touch pad 10e, the display (LCD 10c), the speakers 10g the external display as hardware of the electronic apparatus 10, the setting of another or other hardware may be changed. In this case, an HW control key is assigned to the other hardware, and an area including a mark or the like which indicates the state of the other hardware is provided in the indicator 200. As a result, it is possible to change the setting of the other hardware by pressing the HW control key assigned to the other hardware (HW control operation).

In the above embodiment, if an input device (for example, the keyboard 10d) accepts an operation (second operation) other than the indicator-displaying operation (first operation) while a virtual desktop image transmitted from the VDI server apparatus 40 is being displayed, the electronic apparatus 10 transmits operation information indicating the accepted operation to the VDI server apparatus 40. On the other hand, if the input device accepts the indicator-displaying operation while the virtual desktop image is being displayed, the indicator for changing the setting of hardware of the electronic apparatus 10 (for controlling the hardware) is displayed forward of the virtual desktop image.

In the embodiment, by virtue of the above structure, even in the case where the virtual desktop image is displayed in the thin-client system, the setting of hardware of the electronic apparatus 10 can be changed using an input device, for example, the keyboard 10d.

To be more specific, since the indicator indicating the state of hardware of the electronic apparatus 10 is displayed, even if the virtual desktop image is displayed in the thin-client system, the user can confirm, for example, a connecting condition of the electronic apparatus 10 to the network, the remaining amount of electric power in the battery, the states of other hardware (for example, the setting of the available state/unavailable state of the touch pad 10e, the set value of the brightness of the display, the volume of the speakers 10g and the setting of the external display), etc.

Furthermore, in the case where the input device accepts an HW control operation (third operation) while the indicator is being displayed, the setting of hardware of the electronic apparatus 10 is changed.

That is, in the embodiment, by virtue of the above structure, the user can confirm the present state (the set value) of hardware by referring to the indicator, and change the setting of the hardware.

Furthermore, in the embodiment, in the case where an HW control operation which designates the changed setting of hardware of the electronic apparatus 10 is accepted, if the indicator is displayed to indicate the designated changed setting, and thereafter the input device accepts an operation (fourth operation) which causes the present setting of the hardware to reflect the changed setting, the present setting of the hardware is changed to the above changed setting. It should be noted that in the embodiment, the indicator is displayed while an indicator-displaying operation in which a predetermined key (for example, the "Fn" key on the keyboard 10d) is being pressed continues, and an operation for causing the present setting of hardware to reflect the changed setting designated by the user includes an operation to release the key from the pressed state thereof.

In the embodiment, by virtue of the above, the user can confirm the changed setting by performing the HW control operation, and also change the setting of hardware of the electronic apparatus 10 (i.e., causing it to reflect the changed setting) simply by separating the finger from the "Fn" key (that is, separating the finger, which presses "Fn" key, from the keyboard 10d).

Furthermore, in the embodiment, the HW control operation includes an operation to press a key assigned to hardware of the electronic apparatus 10 (a key other than the "Fn" key). Therefore, it is possible to select hardware the setting of which is to be changed, by pressing a key assigned to the hardware, and thus change the settings of various hardware.

It should be noted that it is explained above that in the embodiment, after a changed setting is designated by performing the HW control operation (pressing of an HW control key), with the "Fn" key pressed, the setting of hardware is changed by separating the finger from the "Fn" key; however, it may be set that the setting of hardware of the electronic apparatus 10 is changed each time the HW control operation is performed.

Furthermore, in the embodiment, in combination of an operation to press a specific key, i.e., the "Fn" key, and an operation to press any of keys other than the specific key (HW control keys assigned to various hardware), the setting of associated hardware is changed. Thus, unlike a structure in which the settings of various hardware are changed by pressing a single key, it is possible to avoid a situation in which the setting of hardware, which the user does not intend to change, is changed by pressing the single key by mistake.

In addition, although it is explained above that in the embodiment, the electronic apparatus 10 is a notebook personal computer, an electronic apparatus (for example, a tablet computer) which is connected to a keyboard including an "Fn" key may be applied as the electronic apparatus 10. Also, in the embodiment, any electronic apparatus can be applied as long as, for example, it can accept operations other than an operation to be performed on a virtual desktop image displayed on a display, as an indicator-displaying operation and an HW control operation.

Furthermore, although it is explained above that in the embodiment, the software for VDI connection is downloaded from the management server apparatus 20, since the embodiment can be applied to an electronic apparatus which operates under the virtual desktop environment, for example, the software for VDI connection may be stored in BIOS-ROM 16 in advance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus being connectable to a first server apparatus for management and a second server apparatus which provides a virtual desktop environment, being operatable under the virtual desktop environment, comprising no internal storage, and being incapable of using an external storage, comprising:
   a display;
   an input device;
   a firmware ROM; and
   a downloader configured to download connection software for connecting the electronic apparatus to the second server apparatus from the first server apparatus by execution of firmware of the firmware ROM;
   a receiver configured to receive a virtual desktop image transmitted from the second server apparatus which is connected to the electronic apparatus by execution of the connection software;
   a first processor configured to display the received virtual desktop image on the display, transmit input information from the input device to the second server apparatus and update the virtual desktop image to be displayed; and
   a second processor configured to acquire, in a case where an input operation for displaying an indicator from the input device is received while the virtual desktop image has been displayed, setting information on a current setting of hardware, and display the indicator for changing the setting information on the display, wherein
   the indicator for changing the setting information is displayed forward of the virtual desktop image.

2. The electronic apparatus of claim 1, further comprising a volatile RAM configured to store operation information including the connection software downloaded from the first server apparatus, wherein content of the RAM is erased in a case where disconnection of the electronic apparatus from the second server apparatus by the firmware is detected, a logoff operation is performed or the electronic apparatus is powered off.

3. The electronic apparatus of claim 1, wherein the indicator is continuously displayed while the input operation for displaying the indicator is being continuously performed, and the indicator is made undisplayed in a case where the input operation for displaying the indicator ends.

4. The electronic apparatus of claim 1, wherein to perform an HW control operation for changing the setting information, a key which varies from hardware to hardware is assigned to the input device, the second processor is configured to change the setting of the hardware based on the HW control operation.

5. The electronic apparatus of claim 4, wherein the indicator includes at least an image for switching between an available state and an unavailable state of a touch pad, an image for setting a brightness of the display and an image for setting a volume of a speaker, and the setting of the hardware is changed based on the HW control operation corresponding to the hardware the setting information of which is to be changed, while the input operation for displaying the indicator is being continuously performed.

6. The electronic apparatus of claim 5, wherein the setting information of the hardware which is changed based on the HW control operation is transmitted to the second server apparatus, and the virtual desktop image which is updated based on the setting information is received from the second server apparatus.

7. A method by an electronic apparatus being connectable to a first server apparatus for management and a second server apparatus which provides a virtual desktop environment, being operatable under the virtual desktop environment, comprising no internal storage, and being incapable of using an external storage, the method comprising:

downloading connection software for connecting the electronic apparatus to the second server apparatus from the first server apparatus by execution of firmware of a firmware ROM;

receiving a virtual desktop image transmitted from the second server apparatus which is connected to the electronic apparatus by execution of the connection software;

displaying the received virtual desktop image on a display, transmitting input information from an input device to the second server apparatus, and updating the virtual desktop image to be displayed; and acquiring setting information on a current setting of hardware in a case where an input operation for displaying an indicator from the input device is received while the virtual desktop image has been displayed, and displaying the indicator for changing the setting information forward of the virtual desktop image.

* * * * *